US007680624B2

(12) United States Patent
McElfresh et al.

(10) Patent No.: US 7,680,624 B2
(45) Date of Patent: Mar. 16, 2010

(54) METHOD AND APPARATUS FOR PERFORMING A REAL-TIME ROOT-CAUSE ANALYSIS BY ANALYZING DEGRADING TELEMETRY SIGNALS

(75) Inventors: David K. McElfresh, San Diego, CA (US); Dan Vacar, San Diego, CA (US); Kenny C. Gross, San Diego, CA (US); Leoncio D. Lopez, Escondido, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 135 days.

(21) Appl. No.: 11/787,506

(22) Filed: Apr. 16, 2007

(65) Prior Publication Data

US 2008/0252441 A1 Oct. 16, 2008

(51) Int. Cl.
*G01V 9/00* (2006.01)

(52) U.S. Cl. ...................................................... 702/152

(58) Field of Classification Search .................. 702/152
See application file for complete search history.

(56) References Cited

U.S. PATENT DOCUMENTS

| | | | | |
|---|---|---|---|---|
| 7,502,971 | B2 * | 3/2009 | Cohen et al. | 714/45 |
| 2007/0049990 | A1 * | 3/2007 | Klostermann et al. | 607/60 |
| 2007/0294591 | A1 * | 12/2007 | Usynin et al. | 714/45 |
| 2008/0120064 | A1 * | 5/2008 | Urmanov et al. | 702/182 |

* cited by examiner

*Primary Examiner*—Aditya Bhat
(74) *Attorney, Agent, or Firm*—Park, Vaughan & Fleming LLP

(57) ABSTRACT

One embodiment of the present invention provides a system that performs a real-time root-cause-analysis for a degradation event associated with a component under test. During operation, the system monitors a telemetry signal collected from the component, and while doing so, attempts to detect an anomaly in the telemetry signal. If an anomaly is detected in the telemetry signal, the system performs a failure analysis on the telemetry signal in real-time while the telemetry signal is degrading. Next, the system identifies a failure mechanism for the component based on the failure analysis.

15 Claims, 3 Drawing Sheets

REAL-TIME RELIABILITY TEST SYSTEM 100

METHOD AND APPARATUS FOR PERFORMING A REAL-TIME ROOT-CAUSE ANALYSIS BY ANALYZING DEGRADING TELEMETRY SIGNALS

BACKGROUND

1. Field of the Invention

The present invention generally relates to techniques for performing electronic prognostics for components in a system. More specifically, the present invention relates to a method and an apparatus that performs a real-time root-cause-analysis for a degradation event associated with a component based on degrading telemetry signals.

2. Related Art

An increasing number of businesses are using computer systems for mission-critical applications. In such computer systems, a component failure can have a devastating effect on the business. For example, the airline industry is critically dependent on computer systems that manage flight reservations, and would essentially cease to function if these systems failed. Hence, it is critically important to be able to measure component reliabilities in such systems to ensure that they meet or exceed reliability requirements.

Typically, component reliabilities are determined through "reliability-evaluation studies." These reliability-evaluation studies can include: "accelerated-life studies," which accelerate the failure mechanisms of a component; or "repair-center reliability evaluations," wherein the vendor tests components returned from the field. These types of tests typically involve using environmental stress-test chambers to hold and/or cycle one or more stress variables (e.g. temperature, humidity, radiation, etc.) at levels that are believed to accelerate subtle failure mechanisms within a component. The components under test are then placed inside the stress-test chamber and subjected to those stress conditions.

While the components are under stress in the stress-test chamber, specific physical variables which indicate the health of the components are being monitored. Outputs from this monitoring process can be used to generate time series data for these variables, which are referred to as "telemetry signals." These telemetry signals can be analyzed in real-time using electronic prognostic techniques to detect anomalies and/or the onset of degradation in the telemetry signals, which can indicate potential component failures.

When component failures are detected or predicted by the electronic prognostics techniques, the faulty telemetry signals collected during the degradation processes are typically recorded for a subsequent root-cause analysis operation, which attempts to determine the "root-cause" of a failure. Knowing the root-cause of a failure allows similar failure events to be corrected or eliminated in the future.

Typically, the root-cause analyses are performed "post-mortem," i.e., as a post-processing step after a component is determined to have failed. As a consequence, postmortem root-cause analysis techniques rely on a priori knowledge of possible failures that can occur in the component of interest. Hence, these techniques require a comprehensive library to be created beforehand which includes all of the failure modes. These failure modes are typically extracted from the past failure events, and are stored in the failure mechanism libraries. Next, the newly-recorded faulty telemetry signals are compared against the failure modes in the failure mechanism library, and a root-cause of failure can be identified if the faulty telemetry signal matches a particular failure mode in the library.

Unfortunately, such a priori knowledge of failure mechanisms is not always available for each failure event. Consequently, many root-cause analyses have to be performed with little or no information on the failure behavior of the components while they transition from a healthy state to a defective state. In such cases, a root-cause analysis may require a physical examination of the faulty components, which can be an extremely cumbersome task. For example, in many cases such physical examination requires the system containing the faulty component be disassembled so that the faulty component can be accessed. However, doing so can destroy evidence associated with the failure mechanism.

Hence, what is needed is a method and an apparatus that facilitates performing a root-cause analysis based on little or no a priori knowledge of the failure mechanism.

SUMMARY

One embodiment of the present invention provides a system that performs a real-time root-cause-analysis for a degradation event associated with a component under test. During operation, the system monitors a telemetry signal collected from the component, and while doing so, attempts to detect an anomaly in the telemetry signal. If an anomaly is detected in the telemetry signal, the system performs a failure analysis on the telemetry signal in real-time while the telemetry signal is degrading. Next, the system identifies a failure mechanism for the component based on the failure analysis.

In a variation on this embodiment, the system performs the failure analysis in real-time by fitting the degrading telemetry signal to a time-dependent failure function.

In a further variation on this embodiment, the system identifies the failure mechanism by: extracting failure signatures from the time-dependent failure function; and comparing the failure signatures with known physics of failure (POF) mechanisms.

In a further variation, the failure signatures can include a shape and a rate of change of the time-dependent failure function.

In a further variation, if the failure signatures do not match the known POF mechanisms, the system adds the time-dependent failure function to a library of failure mechanisms.

In a variation on this embodiment, the system attempts to detect an anomaly in the telemetry signal by: applying a sequential probability ratio test (SPRT) to the telemetry signal and a time derivative of the telemetry signal; and detecting an anomaly when the SPRT generates an alarm.

In a variation on this embodiment, if a failure mechanism is identified for the component, the system takes a remedial action for the identified failure mechanism.

DETAILED DESCRIPTION

Figure 1:
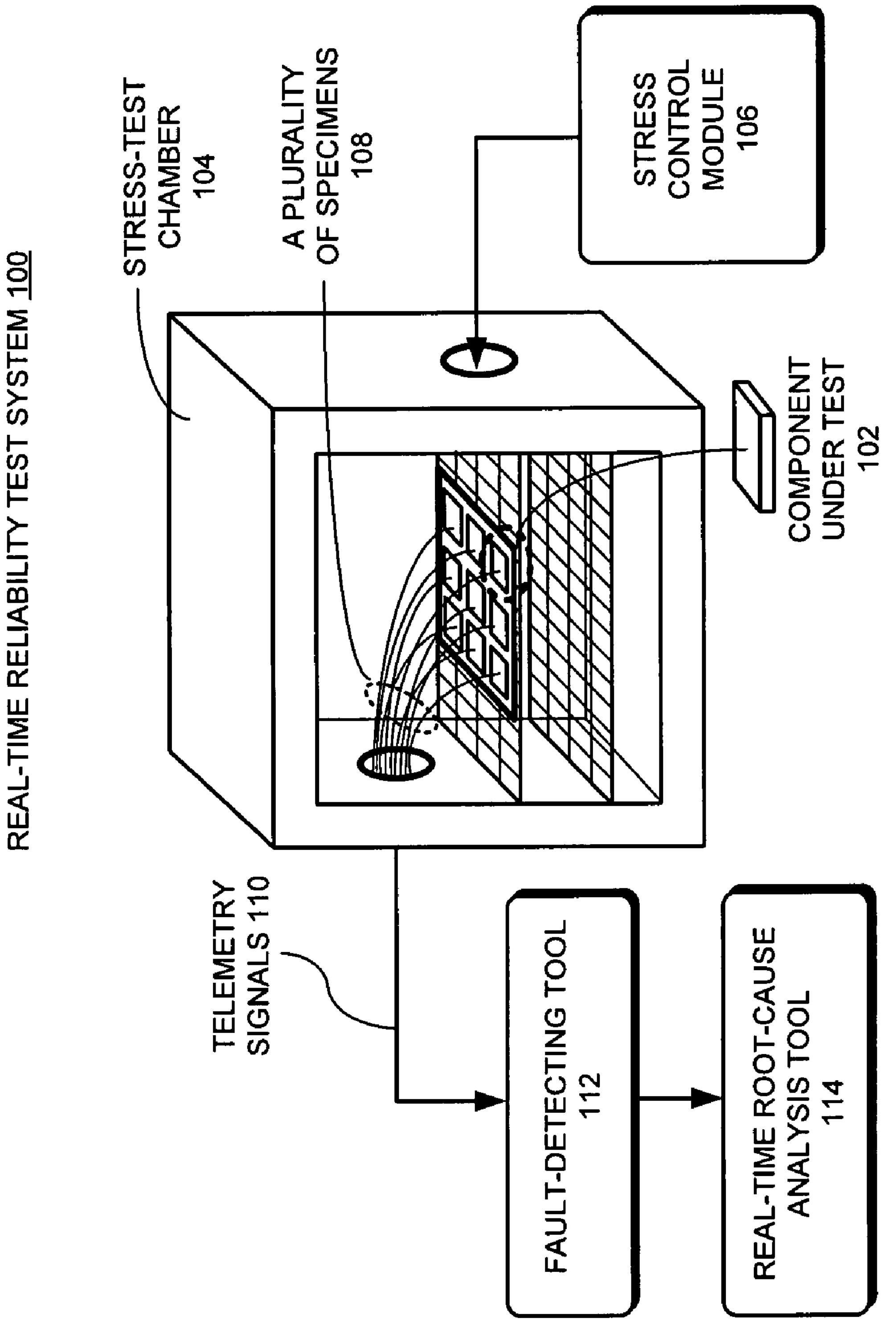
FIG. 1 illustrates a real-time reliability test system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

The time-dependence of a telemetry signal during a degradation process (we use the terms "degradation process" and "degradation event" to describe a transition from a healthy state to a defective state) can provide information that can be used to uniquely identifying a specific class of failure mechanisms or a precise failure mechanism which causes the failure. For example, the dependence of the light output power of a laser as a function of time while the light output power degrades can be used to identify the mechanism causing the degradation. If a root-cause of a failure can be identified during the course of a degradation process, preventive actions specific to the identified failure mechanism can be taken even before a component or system failure takes place.

Note that different failure mechanisms can have very distinct time dependencies which can be used to uniquely identify the mechanism causing the degradation. Specifically, if anomalous activity is detected from a component under surveillance, one embodiment of the present invention fits the telemetry signal that is degrading to a time-dependent failure function. The time-dependence failure function is then analyzed to determine which failure mechanism caused that specific time-dependence and, in doing so, identifies the root-cause of the failure.

Note that the telemetry signal used to construct the time-dependent function can include primary variables, which reflect the primary function of a component or a system, e.g., the voltage of a voltage supply. Alternatively, the present invention can also use the inferential variables in place of the primary variables to determine the underlying root-causes of degradation. Note that these inferential variables are typically easier to access and monitor than the primary variables they reflect. In both cases, the present invention facilitates identifying the root-cause in real-time and without requiring a priori knowledge of the failure mechanism.

Real-Time Reliability Testing

FIG. 1 illustrates a real-time reliability test system 100 in accordance with an embodiment of the present invention. In FIG. 1, a component under test 102 is placed inside a stress-test chamber 104. Component under test 102 can include any type of component in a computer system. For example, component under test 102 can include, but is not limited to: power supplies, capacitors, sockets, interconnects, chips, and hard drives.

Stress control module 106 applies and controls one or more stress variables to the stress-test chamber 104. These stress variables can include, but are not limited to: temperature, humidity, vibration, voltage noise and radiation. In one embodiment of the present invention, stress control module 106 applies sufficient stress factors through stress-test chamber 104 to create accelerated-life studies for component under test 102. The same setup can also be applied to: early failure rate studies of a component; burn-in screens of a component; and repair-center reliability evaluations of a returned component.

As is shown in FIG. 1, stress-test chamber 104 can contain multiple units (specimens) of component under test 102, wherein an array of nine specimens 108 of component under test 102 are shown. Stress-test chamber 104 provides power to each specimen of component under test 102, and gathers telemetry signals 110 from each specimen. Telemetry signals 110 are directed to a local or a remote location that contains fault-detecting tool 112. Telemetry signals 110 can also be recorded in a storage device.

Note that telemetry signals 110 can include outputs from primary system variables, i.e., parameters that reflect the primary function of a component or system, for example, the voltage of a power supply, or the laser output power from an optical transmitter. Telemetry signals 10 can also include outputs from inferential variables which are monitored when primary system variables are difficult to access. For example, if one monitors the electrical current being applied to laser devices, subtle anomalies detected in the time series of the current can be used to infer device degradation and/or failure.

Fault-detecting tool 112 monitors and analyzes telemetry signals 110 in real-time. Specifically, fault-detecting tool 112 detects anomalies in telemetry signals 10, and analyzes the anomalies to determine probabilities of specific faults and failures in the associated component under test. In one embodiment of the present invention, fault-detecting tool 112 includes a Continuous System Telemetry Harness (CSTH), which performs a Sequential Probability Ratio Test (SPRT) on telemetry signals 10. Note that SPRT provides a technique for monitoring noisy process variables and detecting the incipience or onset of anomalies in such process variables with high sensitivity.

Also note that telemetry signals 110 from each specimen of the component can include: current, voltage, resistance, temperature, and other physical variables. Moreover, the plurality of specimens 108 in stress-test chamber 104 can be tested at the same time and under the same conditions. Furthermore, instead of testing multiple components, the stress-test chamber can be configured to test a single component.

When fault-detecting tool 112 detects anomalies in telemetry signals 110, fault-detecting tool 112 sends the faulty telemetry signals to a real-time root-cause analysis tool 114. Real-time root-cause analysis tool 114 is configured to perform real-time root-cause analysis on the faulty telemetry signals, either during the development of the degradation event or immediately after the completion of the degradation event. Note that real-time root-cause analysis tool 114 typically does not use a library of failure mechanisms which is constructed based on a-priori knowledge.

Note that the present invention is not limited to real-time reliability testing using a stress-test chamber. In one embodiment of the present invention, the real-time root-cause analysis can be performed in conjunction with "proactive-fault-monitoring", which monitors a computer system or an electronic device during its normal operation and identifies leading indicators of component or system failures before the failures actually occur. In this embodiment, stress-test chamber 104, stress control module 106, and component under test 102 in FIG. 1 are replaced by a computer system under surveillance, such as a server, or by an electronic device under surveillance, such as a laser.

Real-time Root-Cause-Analysis of a Monitored Telemetry Signal

Figure 2:
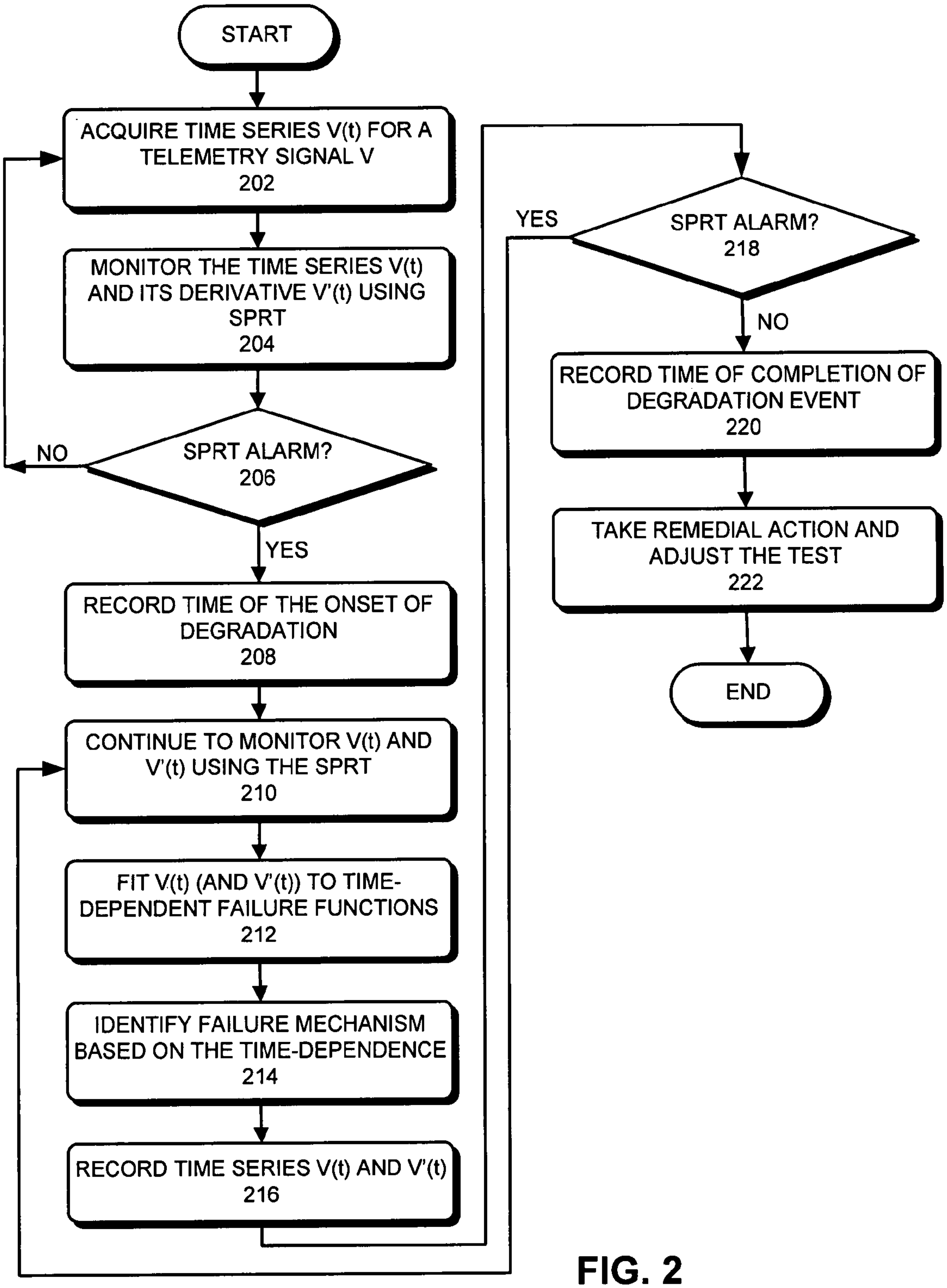
FIG. 2 presents a flowchart illustrating the process of performing a real-time root-cause-analysis while monitoring a component in accordance with an embodiment of the present invention.

FIG. 2 presents a flowchart illustrating the process of performing a real-time root-cause-analysis while monitoring a component in accordance with an embodiment of the present invention.

During the monitoring process, the system acquires time series V(t) of a telemetry signal V using a telemetry device (step 202). Specifically, the telemetry signal V is sampled at a predetermined sampling rate to generate the time series. Note that the telemetry signal V can be associated with either a primary variable, for example, voltage supply to the component, or a inferential variable, for example, the fan speed of a cooling fan component.

The system then monitors the time series V(t) and its derivative V'(t) simultaneously using a Sequential Probability Ratio Test (SPRT) technique (step 204). Note that the SPRT technique can detect subtle changes in a time series with high sensitivity and robustness, even when the sampling rate is low and variations in the variables are a small percentage of the quantization resolution. For example, if the signal value of V starts to drift upward from a normal stationary value, both V(t) and V'(t) will start to change. Using SPRT to monitor both V(t) and V'(t) facilitates accurately determining the onset time of degradation, and also facilitates gathering telemetry signals at greater resolution and accuracy during the degradation period. Alternatively, instead of monitoring both V(t) and V'(t), SPRT can be used to monitor either V(t) or V'(t).

Although the present invention is described in the context of using the SPRT technique, sequential detection techniques other than the SPRT can be used to detect and predict the onset of signal degradation in the time series V(t).

While SPRT is used to monitor the time series V(t) and V'(t), the system determines if a SPRT alarm has been generated (step 206).

If no SPRT alarm has been generated, the system returns to step 202 and continues to monitor V(t) and V'(t) for a potential anomaly.

If a SPRT alarm has been generated, the system records the time for the onset of the degradation event (step 208) and continues to monitor V(t) and V'(t) using SPRT while the signal is degrading (step 210).

While monitoring the degradation of V(t), the system fits failure data V(t) to a time-dependent failure function (step 212), and subsequently identifies a failure mechanism based on the fit to the time-dependent failure function (step 214). Note that the time-dependent failure function can indicate one or more failure mechanisms.

In one embodiment of the present invention, the system fits V(t) to known time-dependent failure functions. Note that each of the known time-dependent failure functions is a quantified failure mode associated with known time constant. Also note that these known time-dependent failure functions are derived directly from the first principles. Hence, the system can identify a failure mechanism for V(t) if V(t) can be fit to one of the known time-dependent failure function forms.

In a further embodiment of the present invention, the system fits V(t) to a general form of a time-dependent failure function, for example, an $n^{th}$-order polynomial. The system then compares the fitted general form of the failure function with known time-dependent failure functions. In this embodiment, the system can identify a failure mechanism if the shape of the fitted general form matches the shape of a known time-dependent failure function.

Note that both embodiments described above use the "shape" of the time-dependent failure function to identify a possible root-cause of failure for the associated degrading component. Also note that the root-cause failure analysis for the faulty component is effectively performed in "real-time" while the degradation event is occurring, which allows a root-cause to be identified in real-time before the completion of the degradation event.

In a further embodiment of the present invention, the system fits V'(t) to a time-dependent failure function using one of the above techniques. Note that V'(t) represents the rate of change of the time-dependent failure function associated with V(t). Hence, V'(t) will be fitted to or compared with the derivative of known time-dependent failure functions. Note that by fitting both V(t) and V'(t) to their associated time-dependent failure functions, the system can achieve higher confidence in identifying a known failure mode for the time series. For example, if V(t) is characterized by an exponential decay, V'(t) should also have exponential temporal-dependence.

While monitoring the degradation of V(t), the system additionally records V(t), and optionally records V'(t) (step 216). In one embodiment, if the system fails to fit V(t) to the known time-dependent failure function forms, the recorded V(t) can be used to construct a new time-dependent failure function.

While monitoring the faulty signal V(t), the system continuously detects if the degradation event has completed based on SPRT alarms (step 218). If SPRT alarms continue to be generated, the system returns to step 210 to continue monitoring V(t) and V'(t). Otherwise, if SPRT alarms have stopped, which indicates that the degradation event has completed, and the degrading signal has entered a new steady state, the system records the completion time of the degradation event (step 220).

In one embodiment of the present invention, the system does not perform the root-cause failure analysis during the degradation event. Instead, step 212 and step 214 are performed immediately after step 220, i.e., after the completion of the degradation event. Note that this embodiment can still facilitate a near real-time root-cause analysis and can avoid the need to perform a destructive physical failure analysis.

Next, the system can decide if any action should be taken and/or any adjustment should be made to the test conditions based on the identified failure mechanism (step 222).

In one embodiment of the present invention, based on the identified root-cause failure mechanism, risk assessments can be made in real-time and remedial actions can be taken promptly. For example, if the root-cause of a failure is caused by an overstress condition, action can be taken to alleviate the overstress, which alleviates the impact of the overstress on other components. In another example, if the root-cause of a failure is found to be electrostatic discharge (ESD), other ESD-induced failures can be expected to occur in other components in the subsystem associated with the failure component. In this case, the entire subsystem may have to be replaced or shut down.

In one embodiment of the present invention, the system does not wait for the completion of the degradation event to take remedial action. Instead, the system can perform step 222 immediately after step 214, i.e., immediately after the root-cause failure mechanism has been identified.

EXAMPLES OF KNOWN FAILURE MECHANISMS

Figure 3A:
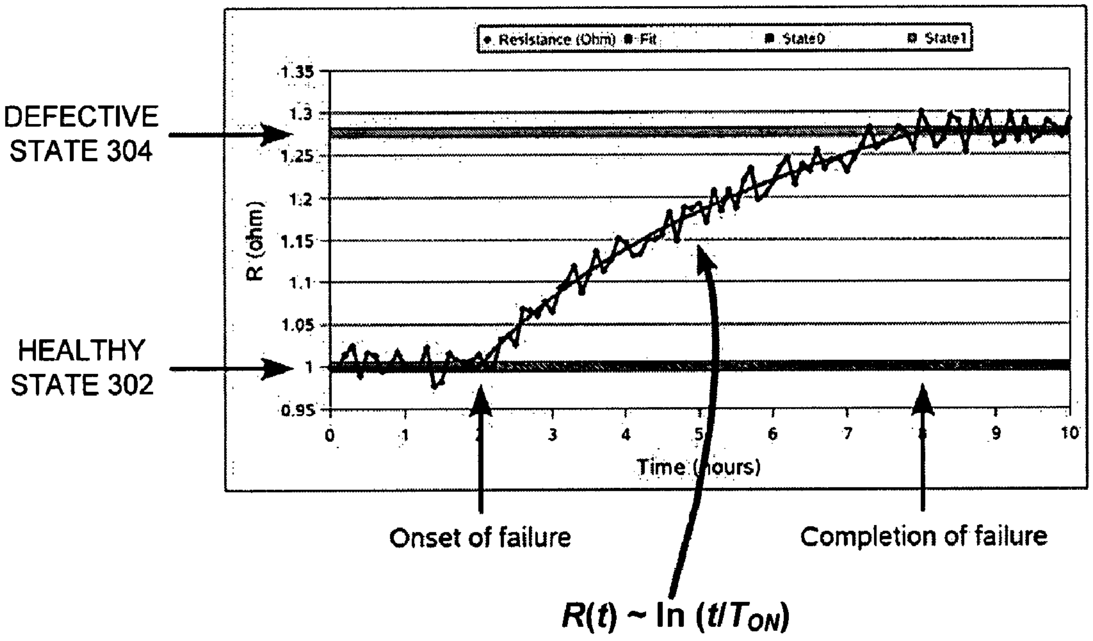
FIG. 3A illustrates an exemplary known-failure-mechanism with a creep-type functional time dependence in accordance with an embodiment of the present invention.

FIG. 3A illustrates an exemplary known-failure-mechanism with a creep-type functional time dependence in accordance with an embodiment of the present invention.

The failure mechanism in FIG. 3A is observed while monitoring a contact resistance associated with a specific type of socket. As seen in FIG. 3A, between the 0th hour and the 2nd hour, the system follows a healthy state 302 which is characterized by a stationary resistance of 1 Ω and a small dynamical variance. The system detects an onset of failure in the resistance value at the 2nd hour, wherein the degradation causes the contact resistance to continuously creep up until completion of the failure at the 8th hour. At completion of the failure, the contact resistance value reaches a defective state 304 which is associated with a higher resistance value of 1.275Ω.

Based on the shape and the rate of change (i.e., the derivative) of the time-dependent degradation, and in conjunction with a physics of failure (POF) analysis, a failure mechanism can be inferred as creeping of an elastomer interconnect. The functional time dependence of this failure mechanism is characterized by a logarithmic function: $R(t)\sim\ln(t/T_{ON})$, wherein $T_{ON}$ is the onset time of failure.

Figure 3B:
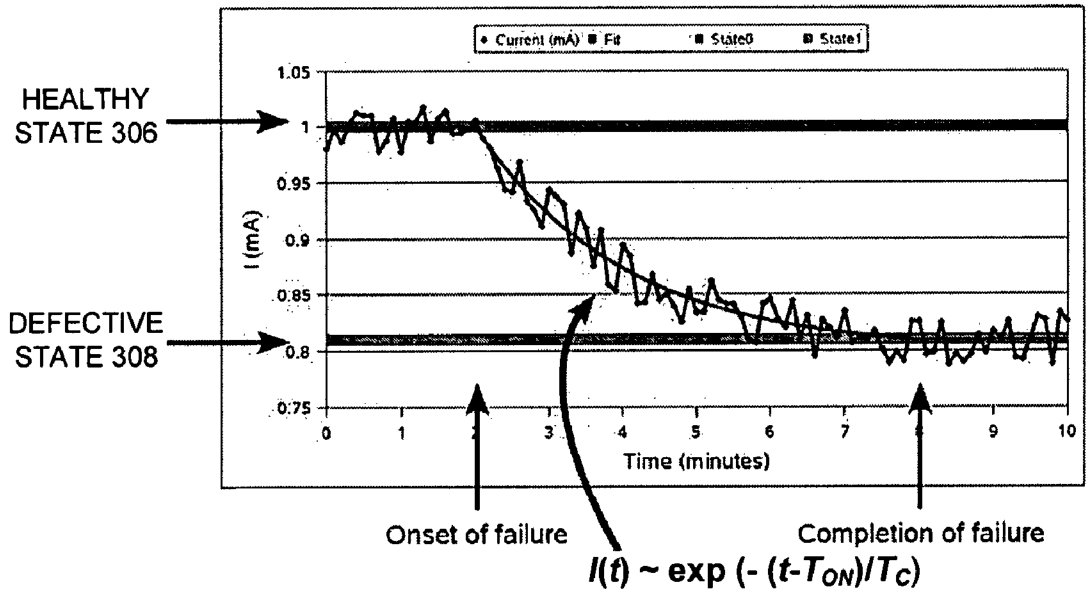
FIG. 3B illustrates an exemplary known-failure-mechanism with a decay-type functional time dependence in accordance with an embodiment of the present invention.

FIG. 3B illustrates an exemplary known-failure-mechanism with a decay-type functional time dependence in accordance with an embodiment of the present invention.

The failure mechanism of FIG. 3B is observed while monitoring current flowing through an interconnect. As seen in FIG. 3B, between the 0th minute and the 2nd minute, the system resides in a healthy state 306 which is characterized by a stationary current of 1 mA and a small dynamical variance. The system detects an onset of failure by monitoring the current at the 2nd minute, wherein the degradation causes a continuous decrease in current until completion of the failure at the 8th minute. At completion of the failure, the current value reaches a defective state 308 which is associated with a much smaller current value of 0.81 mA.

Based on the shape and the rate of change (i.e., the derivative) of the recorded degradation behavior, and in conjunction with a physics of failure (POF) analysis, a failure mechanism can be inferred as oxide growth at the contact interface of the interconnect. The functional time dependence of this failure mechanism is characterized by an exponential-decay function:

$I(t)\sim\exp(-t-T_{ON}/T_C)$, wherein $T_{ON}$ and $T_C$ are the onset time and completion time of the failure, respectively.

Note that the above examples describe identifying root-cause failure mechanisms from resistance and current measurements. However, the general technique of identifying root-cause failure mechanisms based on first principles can be applied to any other primary variables or inferential variables.

CONCLUSION

The time function that a failure follows provides valuable information on the present and future state of an associated component and/or system. One embodiment of the present invention facilitates analyzing the time-dependence of a degrading telemetry signal and determining the root-cause of the failure in real-time. In doing so, risk assessments can be made in real-time and remedial actions can be rapidly taken to protect components and systems.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a real-time root-cause-analysis for a degradation event associated with a component under test, comprising:
  using at least one computer for:
    monitoring a telemetry signal, wherein detecting an anomaly in the telemetry signal involves applying a sequential probability ratio test (SPRT) to the telemetry signal and a time derivate of the telemetry signal and detecting an anomaly when the SPRT generates an alarm; collected from the component, and while doing so attempting to detect an anomaly in the telemetry signal; and
    when an anomaly is detected in the telemetry signal,
      performing a failure analysis on the telemetry signal by fitting the degrading telemetry signal to a time-dependent failure function in real-time while the telemetry signal is degrading; and
      attempting to identify a failure mechanism for the telemetry signal based on the failure analysis.

2. The method of claim 1, wherein identifying the failure mechanism based on the failure analysis involves:
  extracting failure signatures from the time-dependent failure function; and
  comparing the failure signatures with known physics of failure (POF) mechanisms.

3. The method of claim 2, wherein the failure signatures can include a shape and a rate of change of the time-dependent failure function.

4. The method of claim 2, wherein if the failure signatures do not match the known POF mechanisms, the method further comprises adding the time-dependent failure function to a library of failure mechanisms.

5. The method of claim 1, wherein if a failure mechanism is identified for the component, the method further comprises taking a remedial action for the identified failure mechanism.

6. A computer-readable storage medium storing instructions that when executed by a computer cause the computer to perform a method for performing a real-time root-cause-analysis for a degradation event associated with a component under test, the method comprising:
  monitoring a telemetry signal, wherein detecting an anomaly in the telemetry signal involves applying a sequential probability ratio test (SPRT) to the telemetry signal and a time derivate of the telemetry signal and detecting an anomaly when the SPRT generates an alarm; collected from the component, and while doing so attempting to detect an anomaly in the telemetry signal; and
  when an anomaly is detected in the telemetry signal,
    performing a failure analysis on the telemetry signal by fitting the degrading telemetry signal to a time-dependent failure function in real-time while the telemetry signal is degrading; and
    attempting to identify a failure mechanism for the telemetry signal based on the failure analysis.

7. The computer-readable storage medium of claim 6, wherein identifying the failure mechanism based on the failure analysis involves:

extracting failure signatures from the time-dependent failure function; and comparing the failure signatures with known physics of failure (POF) mechanisms.

8. The computer-readable storage medium of claim 7, wherein the failure signatures can include a shape and a rate of change of the time-dependent failure function.

9. The computer-readable storage medium of claim 7, wherein if the failure signatures do not match the known POF mechanisms, the method further comprises adding the time-dependent failure function to a library of failure mechanisms.

10. The computer-readable storage medium of claim 6, wherein if a failure mechanism is identified for the component, the method further comprises taking a remedial action for the identified failure mechanism.

11. An apparatus that performs a real-time root-cause-analysis for a degradation event associated with a component under test, comprising:

a monitoring mechanism configured to monitor a telemetry signal, wherein when detecting an anomaly in the telemetry signal, the monitoring mechanism is configured to apply a sequential probability ratio test (SPRT) to the telemetry signal and a time derivative of the telemetry signal and detect an anomaly when the SPRT generates an alarm collected from the component, and while doing so attempting to detect an anomaly in the telemetry signal;

a failure-analysis mechanism configured to perform a failure analysis on the telemetry signal by fitting the degrading telemetry signal to a time-dependent failure function-in real-time while the telemetry signal is degrading; and an identification mechanism configured to attempt to identify a failure mechanism for the telemetry signal based on the failure analysis.

12. The apparatus of claim 11, wherein the identification mechanism is configured to:

extract failure signatures from the time-dependent failure function; and compare the failure signatures with known physics of failure (POF) mechanisms.

13. The apparatus of claim 12, wherein the failure signatures can include a shape and a rate of change of the time-dependent failure function.

14. The apparatus of claim 12, wherein the identification mechanism is configured to add the time-dependent failure function to a library of failure mechanisms if the failure signatures do not match the known POF mechanisms.

15. The apparatus of claim 11, wherein if a failure mechanism is identified for the component, the identification mechanism is further configured to take a remedial action for the identified failure mechanism.

* * * * *

UNITED STATES PATENT AND TRADEMARK OFFICE

CERTIFICATE OF CORRECTION

PATENT NO. : 7,680,624 B2
APPLICATION NO. : 11/787506
DATED : March 16, 2010
INVENTOR(S) : David K. McElfresh et al.

It is certified that error appears in the above-identified patent and that said Letters Patent is hereby corrected as shown below:

In claim 1 (at column 8, line 20), please replace the word “derivate” with the word --derivative--.

In claim 6 (at column 8, line 56), please replace the word “derivate” with the word --derivative--.

Signed and Sealed this

Twenty-fifth Day of May, 2010

David J. Kappos
*Director of the United States Patent and Trademark Office*